(12) United States Patent
Vehse et al.

(10) Patent No.: US 7,765,320 B2
(45) Date of Patent: Jul. 27, 2010

(54) CONFIGURATION OF FILTER FOR DATA STREAM ORGANIZED IN FRAMES

(75) Inventors: Andreas Vehse, Berlin (DE); Mike Wiedemann, Falkensee (DE)

(73) Assignee: Tektronix, Inc., Beaverton, OR (US)

( * ) Notice: Subject to any disclaimer, the term of this patent is extended or adjusted under 35 U.S.C. 154(b) by 1548 days.

(21) Appl. No.: 11/070,472

(22) Filed: Mar. 1, 2005

(65) Prior Publication Data

US 2005/0243728 A1 Nov. 3, 2005

(30) Foreign Application Priority Data

Apr. 15, 2004 (EP) .................................. 04009030

(51) Int. Cl.
*G06F 15/16* (2006.01)
(52) U.S. Cl. .................. 709/238; 709/230; 709/224; 370/241; 714/701; 345/734; 715/736
(58) Field of Classification Search .................. 709/224, 709/230, 238; 370/241; 714/701; 345/734
See application file for complete search history.

(56) References Cited

U.S. PATENT DOCUMENTS

| | | | | | |
|---|---|---|---|---|---|
| 5,568,613 | A  * | 10/1996 | Futral | ........................ | 709/249 |
| 5,638,515 | A  * |  6/1997 | Futral | ........................ | 370/402 |
| 6,321,338 | B1 * | 11/2001 | Porras et al. | .................. | 726/25 |
| 6,389,030 | B1 * |  5/2002 | Coden | ........................ | 370/404 |
| 6,484,203 | B1 * | 11/2002 | Porras et al. | ................ | 709/224 |
| 6,708,212 | B2 * |  3/2004 | Porras et al. | ................ | 709/224 |
| 6,711,615 | B2 * |  3/2004 | Porras et al. | ................ | 709/224 |
| 6,801,940 | B1 * | 10/2004 | Moran et al. | ................ | 709/224 |
| 6,931,574 | B1 * |  8/2005 | Coupal et al. | ................ | 714/39 |
| 7,046,680 | B1 * |  5/2006 | McDysan et al. | ........... | 370/396 |
| 7,047,297 | B2 * |  5/2006 | Huntington et al. | ......... | 709/224 |
| 7,149,189 | B2 * | 12/2006 | Huntington et al. | ......... | 370/235 |
| 7,162,698 | B2 * |  1/2007 | Huntington et al. | ......... | 715/736 |
| 7,260,645 | B2 * |  8/2007 | Bays | ........................ | 709/238 |
| 7,315,894 | B2 * |  1/2008 | Huntington et al. | ......... | 709/224 |
| 7,342,897 | B1 * |  3/2008 | Nader et al. | ................. | 370/255 |
| 7,428,211 | B2 * |  9/2008 | Yu | ............................. | 370/223 |
| 7,486,614 | B2 * |  2/2009 | Yu | ............................. | 370/223 |
| 7,607,093 | B2 * | 10/2009 | Blomquist | .................. | 715/736 |
| 2002/0156886 | A1 * | 10/2002 | Krieski et al. | ............... | 709/224 |
| 2003/0131098 | A1 * |  7/2003 | Huntington et al. | ......... | 709/224 |
| 2003/0135612 | A1 * |  7/2003 | Huntington et al. | ......... | 709/224 |
| 2003/0145226 | A1 * |  7/2003 | Bruton et al. | ............... | 713/201 |
| 2003/0204619 | A1 * | 10/2003 | Bays | ........................ | 709/238 |
| 2004/0010718 | A1 * |  1/2004 | Porras et al. | ................. | 713/201 |
| 2005/0076113 | A1 * |  4/2005 | Klotz et al. | ................. | 709/224 |
| 2006/0224659 | A1 * | 10/2006 | Yu | ............................. | 709/201 |
| 2007/0011321 | A1 * |  1/2007 | Huntington et al. | ......... | 709/224 |

* cited by examiner

*Primary Examiner*—Hassan Phillips
*Assistant Examiner*—Anthony Mejia
(74) *Attorney, Agent, or Firm*—Francis I. Gray; Michael J. Fogarty, III

(57) ABSTRACT

A method of configuring a filter for a data stream organized in frames in a protocol tester that is simple without requiring any knowledge of an internal protocol configuration provides the frames partially decoded in an overview display. A user searches the frames for a desired content and selects one of the frames having the desired content. The selected frame is displayed in a fully decoded view. A filter rule is derived from the desired content for configuring the filter. The filter rule may be further defined by modifying parameters from the fully decoded view of the selected frame. The configured filter is applied to all the frames to produce a set of filtered frames.

10 Claims, 13 Drawing Sheets

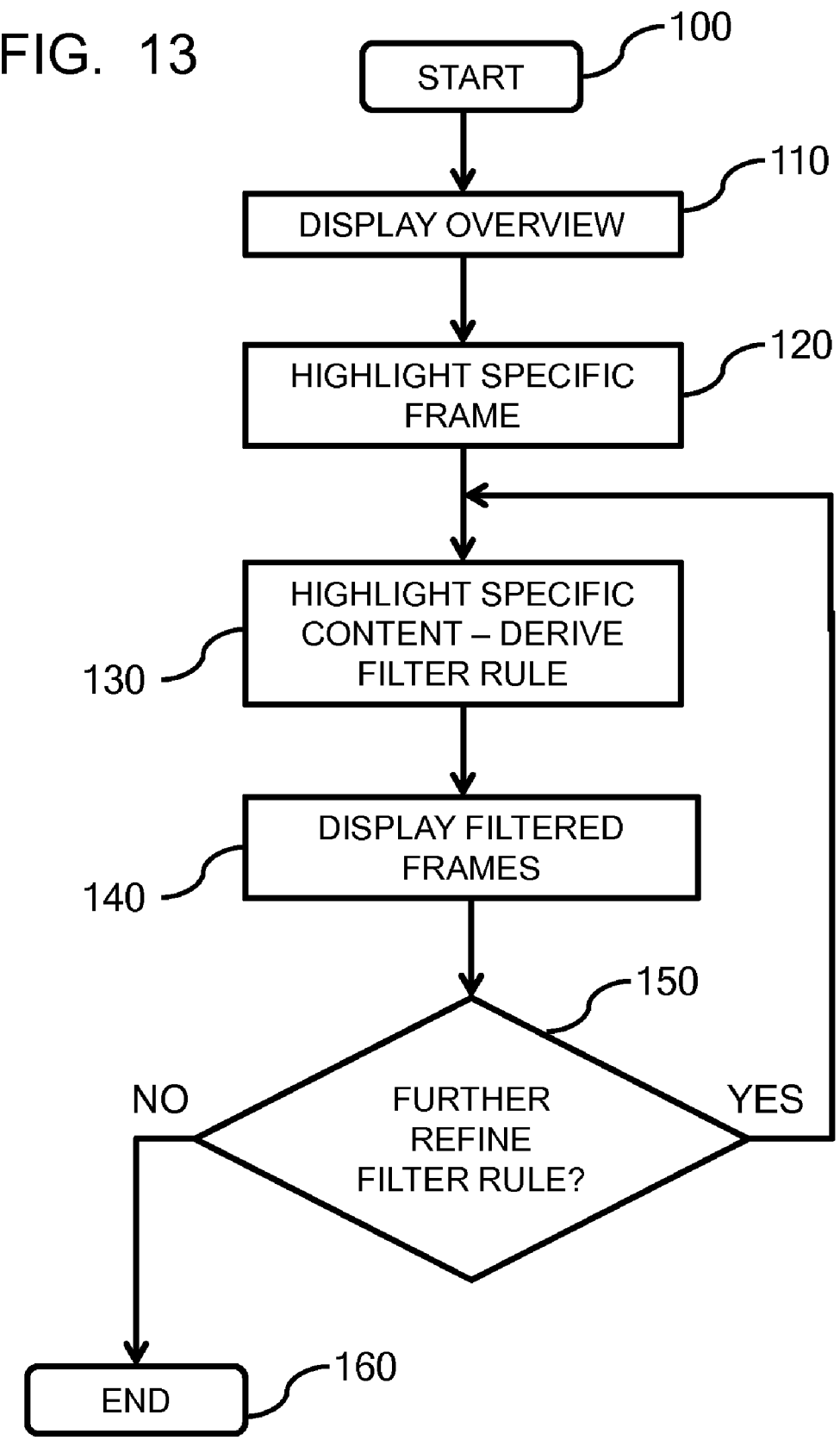

CONFIGURATION OF FILTER FOR DATA STREAM ORGANIZED IN FRAMES

BACKGROUND OF THE INVENTION

The present invention relates to protocol testing, and more particularly to a method of configuring a filter for a data stream organized in frames in a protocol tester.

Protocol testers record a large amount of data. Therefore for a meaningful evaluation the amount of data to be shown an operator on a monitor is reduced by various types of filters. FIG. 1 shows a graphical user interface (GUI) of a display unit with several information windows and several icons by which selections may be made and functions triggered, as known from Windows® application programs. Predefined filter groups are shown in a group window 10 with the associated filters shown in a filter window 12. The selection of the filter type with which a data stream between a data source 16 and a data sink 18 is filtered is shown for clarification in a graphic window 14. The data source 16 may have several individual data sources, the initial data of the individual data sources being compiled into a serial data stream that then passes through the selected filter. For the sake of clarity only the features of the filter configuration known from the prior art which are relevant for understanding the current invention are explained in more detail below.

By clicking on an appropriate icon 20 the display changes from FIG. 1 to FIG. 2. A stack window 22 shows various configured protocol stacks, with a scroll bar 24 allowing additional configured protocol stacks to be shown in this window. A protocol window 26 shows the protocols belonging to the protocol stack highlighted in the first window 22. A message window 28 shows messages belonging to the protocol stack highlighted in the protocol window 26. A parameter window 30 shows the parameters or field names belonging to the message highlighted in the message window 28. By clicking on the appropriate icon 32 the corresponding filter is enabled and the display changes to that shown in FIG. 3.

As is seen from the graphic window 14 in FIG. 3 the data stream now runs through the filter. In the present example the task of an operator is to extract from the data stream frames containing an RPAC-UL message. Therefore the operator has to configure the filter accordingly. This requires considerable expert knowledge. First the operator has to know which protocol contains the RPAC-UL message and, second, in which protocol stack the relevant protocol is to be found. A skilled user may have a good idea where to look, but an unskilled user has to take a chance or systematically test all protocol stacks and protocols until the corresponding RPAC-UL message is shown in a window. With luck, expertise or patience the user eventually receives the display shown in FIG. 4 where the RPAC-UL message appears in the message window 28 as part of the SMRP protocol (protocol window 26) which is part of the protocol stack umts_iu_cs_ps_sms_i . . . (stack window 22). By highlighting RPAC-UL (FIG. 5) the filter is configured accordingly and the data stream emanating from the data source 16 is filtered accordingly.

The result of the filtering is shown in FIG. 6 where the frames from the data stream containing the RPAC-UL message are shown in a short view window 36. The short view window 36 has several columns: consecutive numbers of the frames 39; time stamps assigned to the frames 40; data source 42; and in an ordered fashion the protocols and associated messages contained in the relevant frame 44a, 44b, 46a, 46b, 48a, 48b. As shown, frame number 681 is highlighted. The content of the highlighted frame, sorted by protocols, is shown in a fully decoded format in a frame view window 38. Also in the short view window 36 a second protocol SCCOP is further highlighted 50. In the frame view window 38 the selected frame 52 is shown starting with the protocol SCCOP 54. A first column 56 shows a bitmask, a second column 58 shows the name of a protocol data unit and a third column 60 shows a corresponding comment or value belonging thereto. In a first section 62 the protocol data units of message SD are shown. In a selected frame window 64 the selected frame is shown in a hexadecimal format. As shown in the short view window 36 five frames have been selected by filtering the data stream. FIG. 7 shows in a configuration window 66 relevant data for the configuration of the filter for displaying the result shown in FIG. 6. This information may be saved and offered later for selection by the operator as a predefined filter.

What is desired is a method of configuring a filter in a simple manner without requiring extensive expert knowledge on the part of a user.

BRIEF SUMMARY OF THE INVENTION

Accordingly the present invention provides for a protocol tester a method of configuring a filter for a data stream organized in frames that is simple without requiring any knowledge of an internal protocol configuration. The frames are decoded and displayed in an overview. A user searches the decoded frames for a desired content and highlights one of the decoded frames having the desired content, as well as the desired content. The selected frame is displayed in a fully decoded view. A filter rule is derived from the highlighted content for configuring the filter. The filter rule may be further defined by modifying parameters from the fully decoded view of the selected frame. The configured filter is applied to all the frames to produce a set of filtered frames as the overview.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 13 is a signal flow diagram view for configuring a filter according to the present invention.

DETAILED DESCRIPTION OF THE INVENTION

Figure 1:
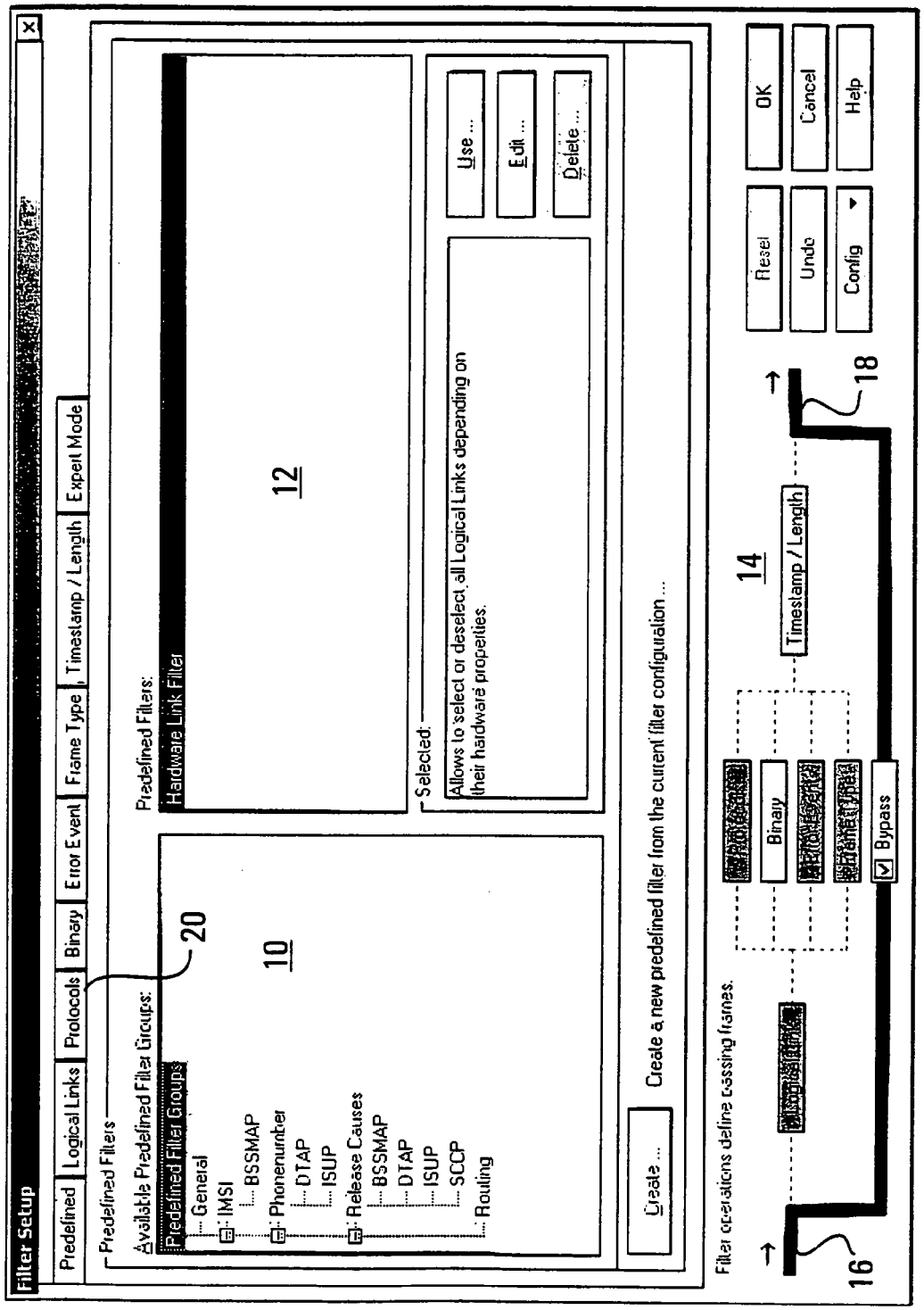
FIG. 1 is a plan view of a first graphical user interface for configuring a filter for a data stream according to the prior art.
Figure 2:
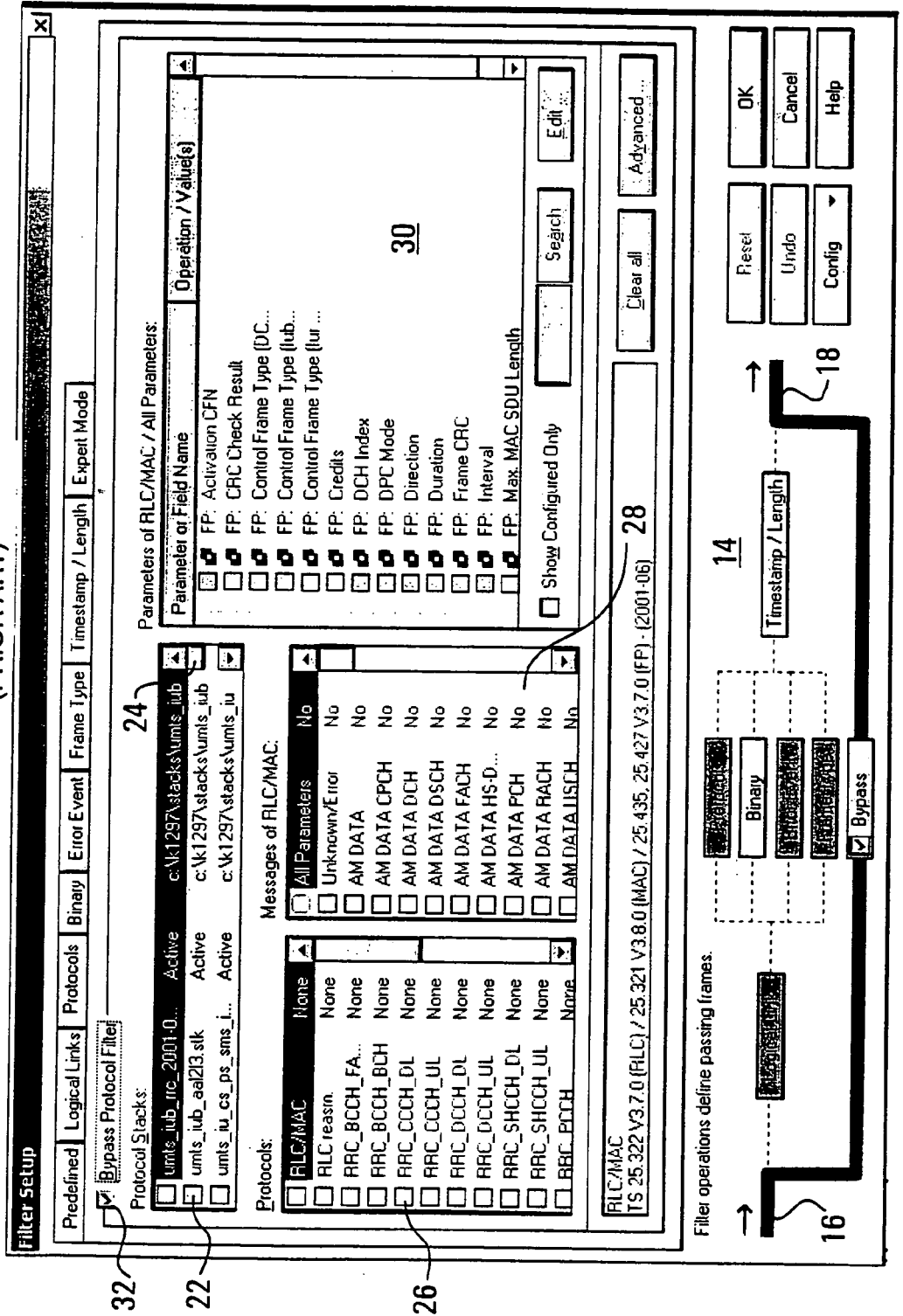
FIG. 2 is a plan view of a second graphical user interface for configuring a filter according to the prior art.
Figure 3:
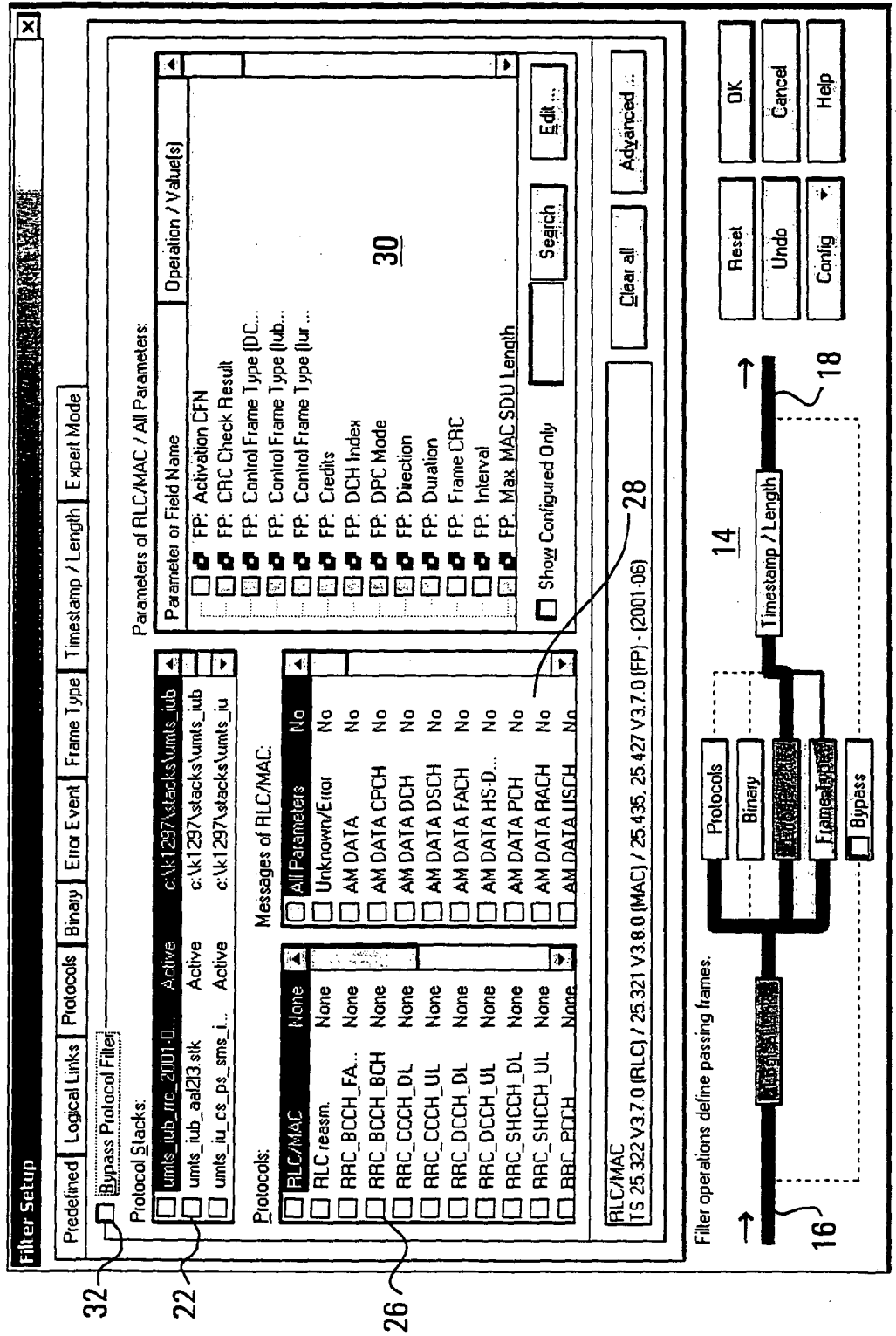
FIG. 3 is a plan view of a third graphical user interface for configuring a filter according to the prior art.
Figure 4:
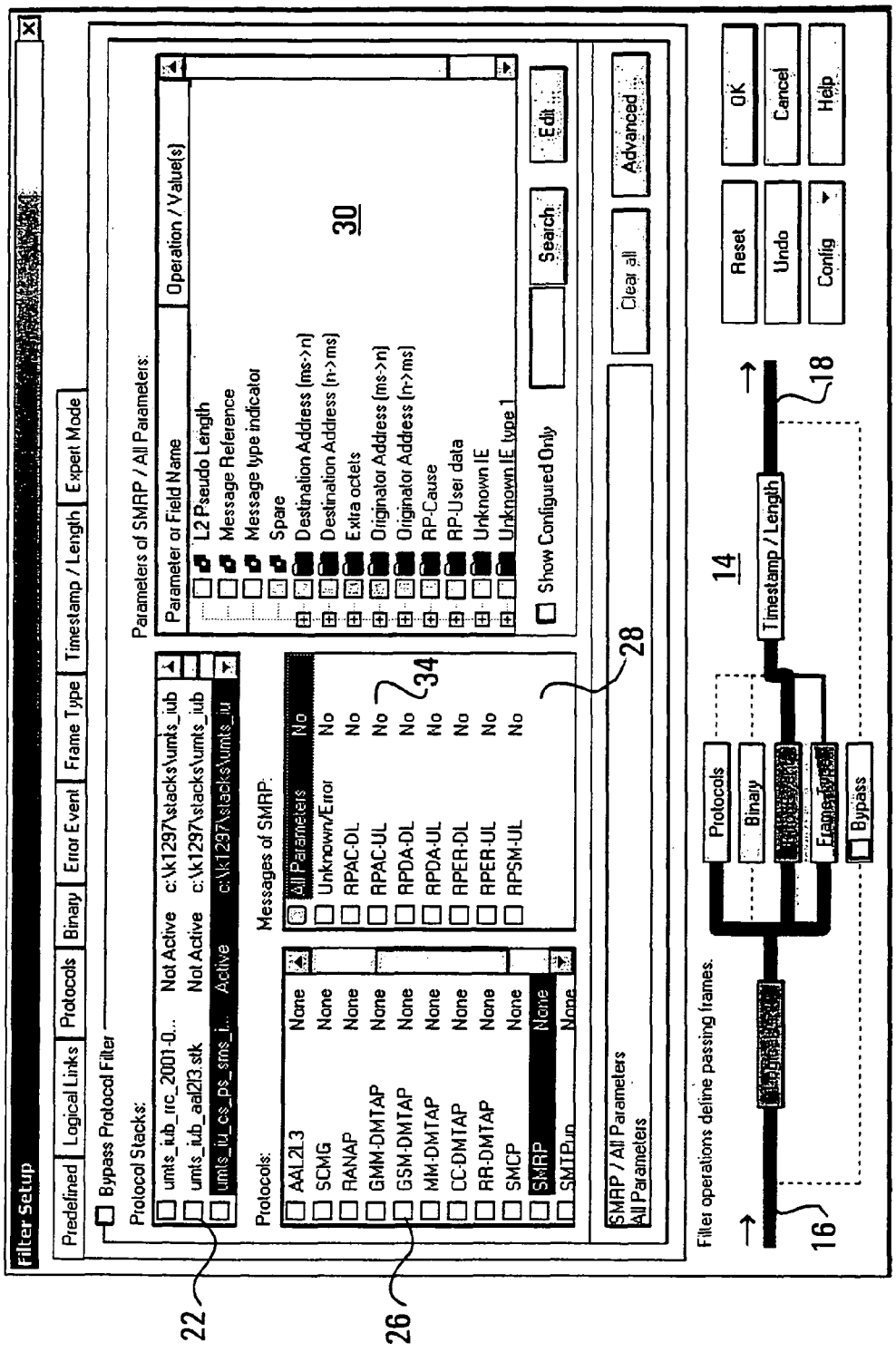
FIG. 4 is a plan view of a fourth graphical user interface for configuring a filter according to the prior art.
Figure 5:
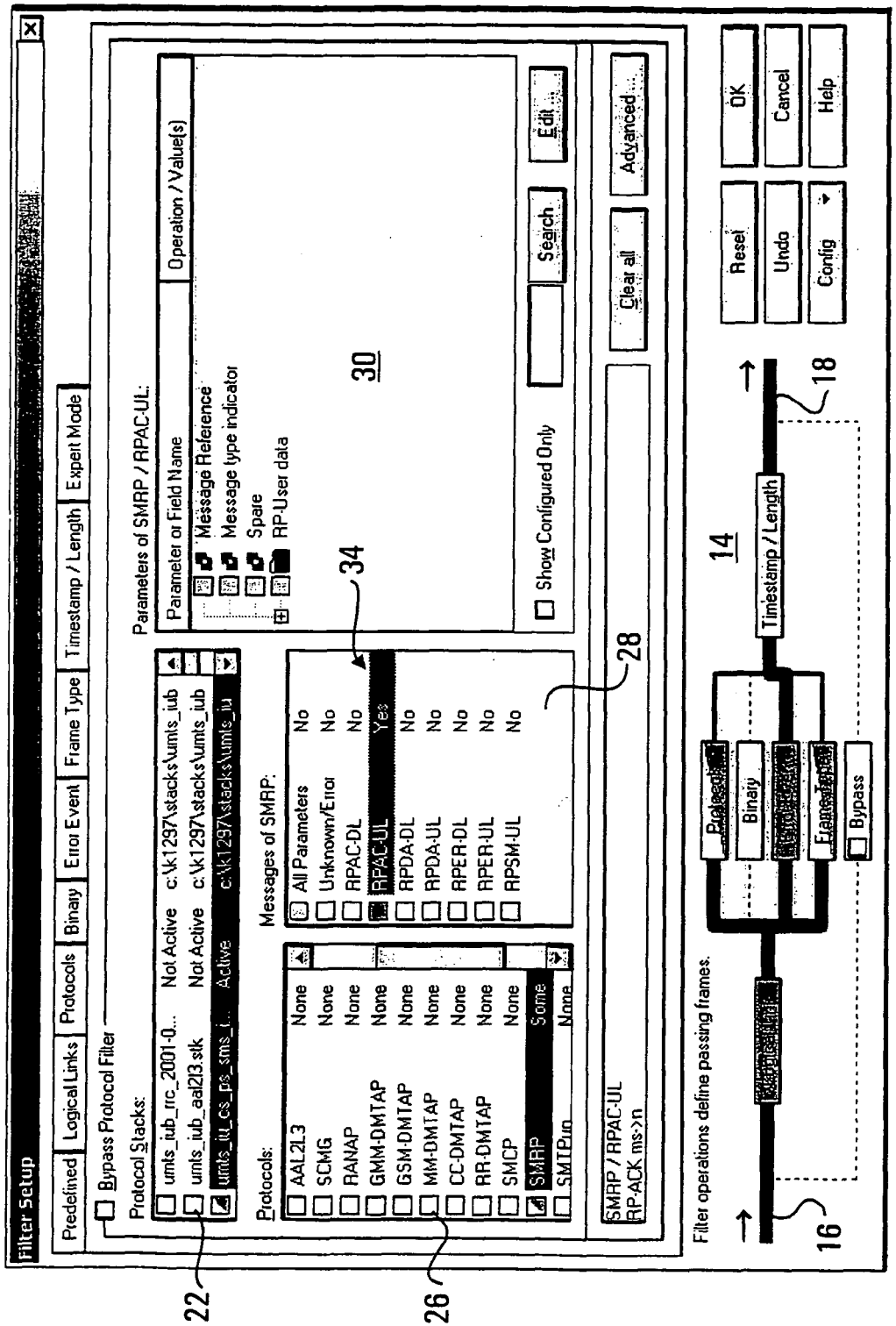
FIG. 5 is a plan view of a fifth graphical user interface for configuring a filter according to the prior art.
Figure 6:
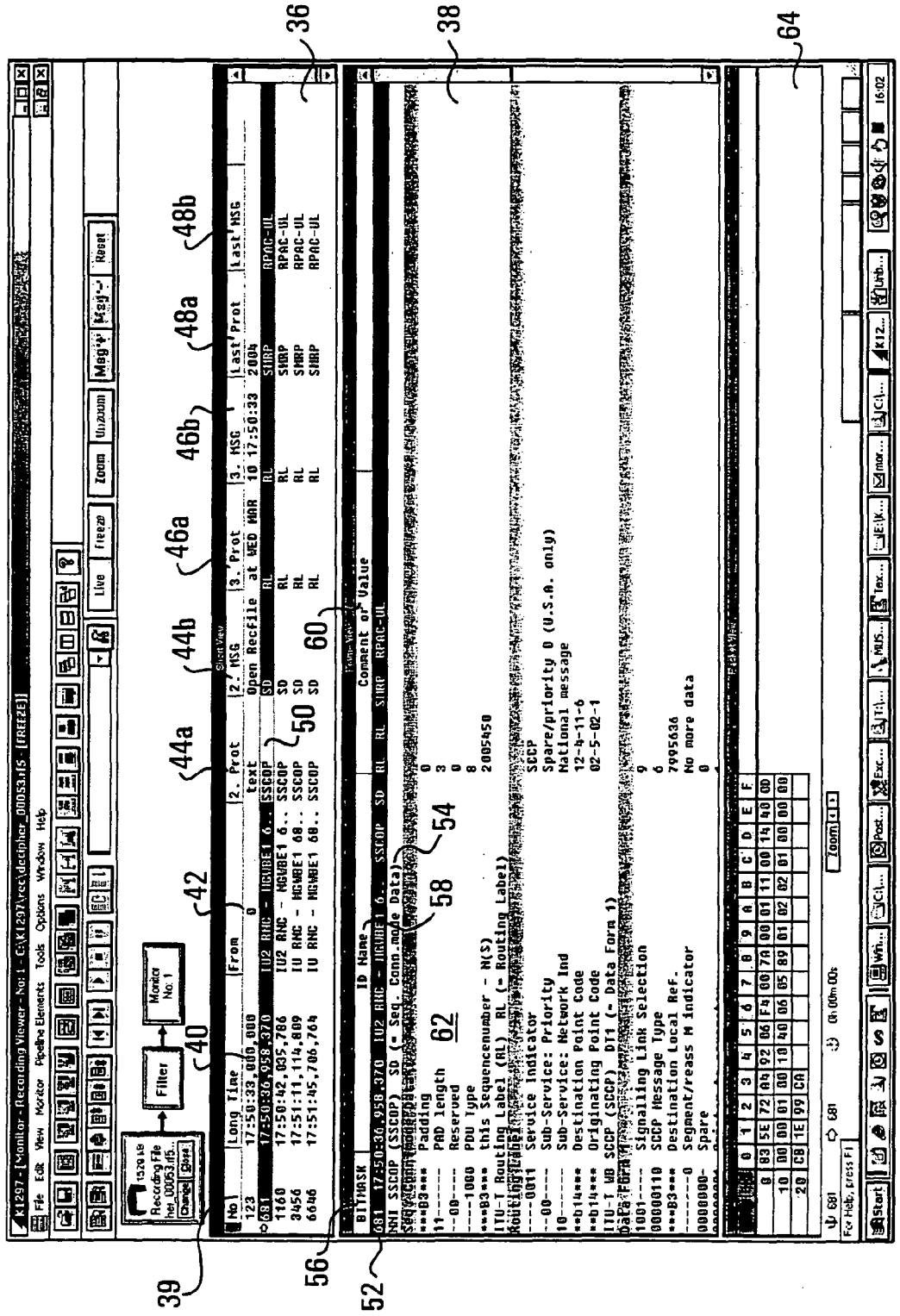
FIG. 6 is a plan view of a sixth graphical user interface for configuring a filter according to the prior art.
Figure 7:
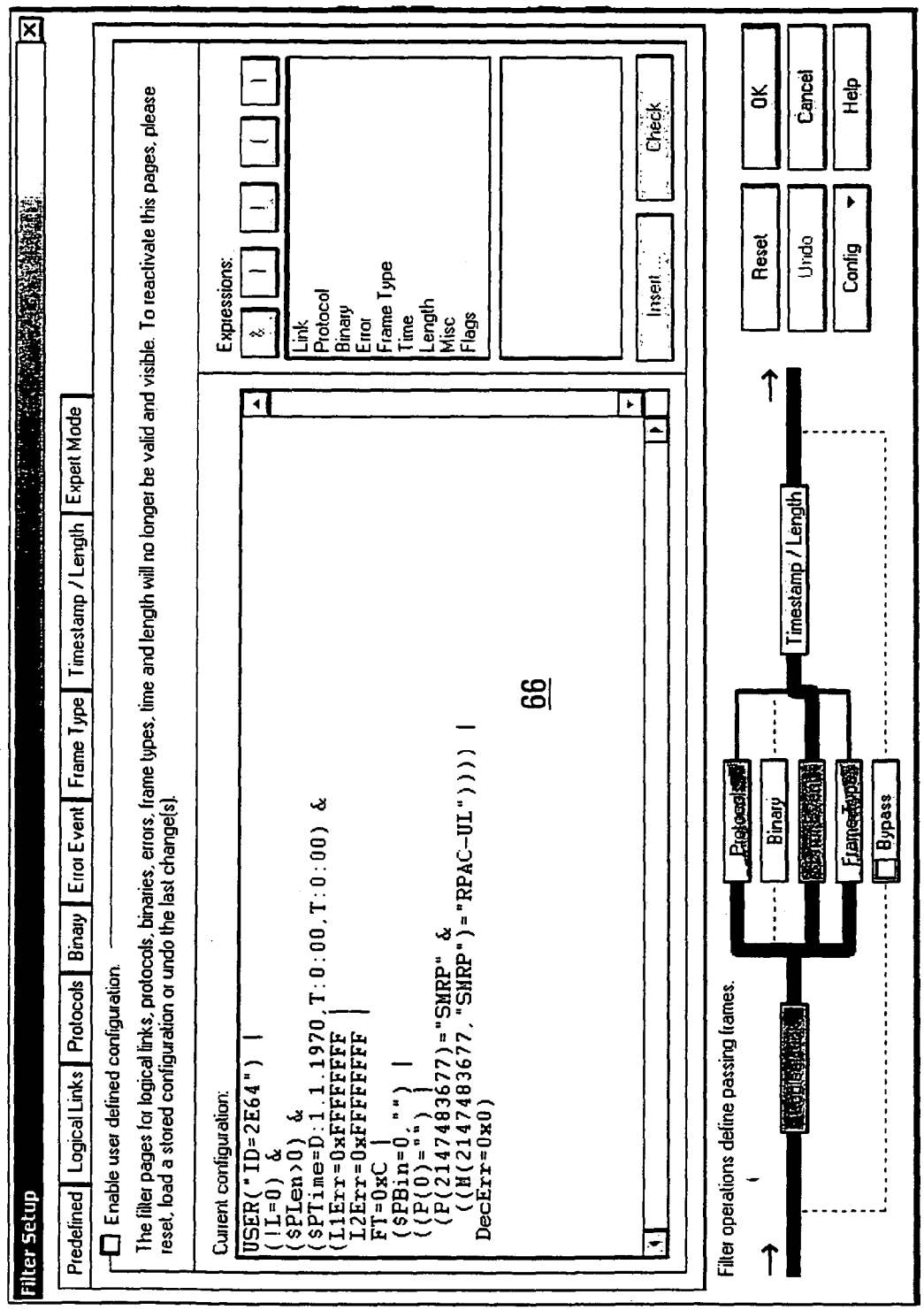
FIG. 7 is a plan view of a seventh graphical user interface for configuring a filter according to the prior art.
Figure 8:
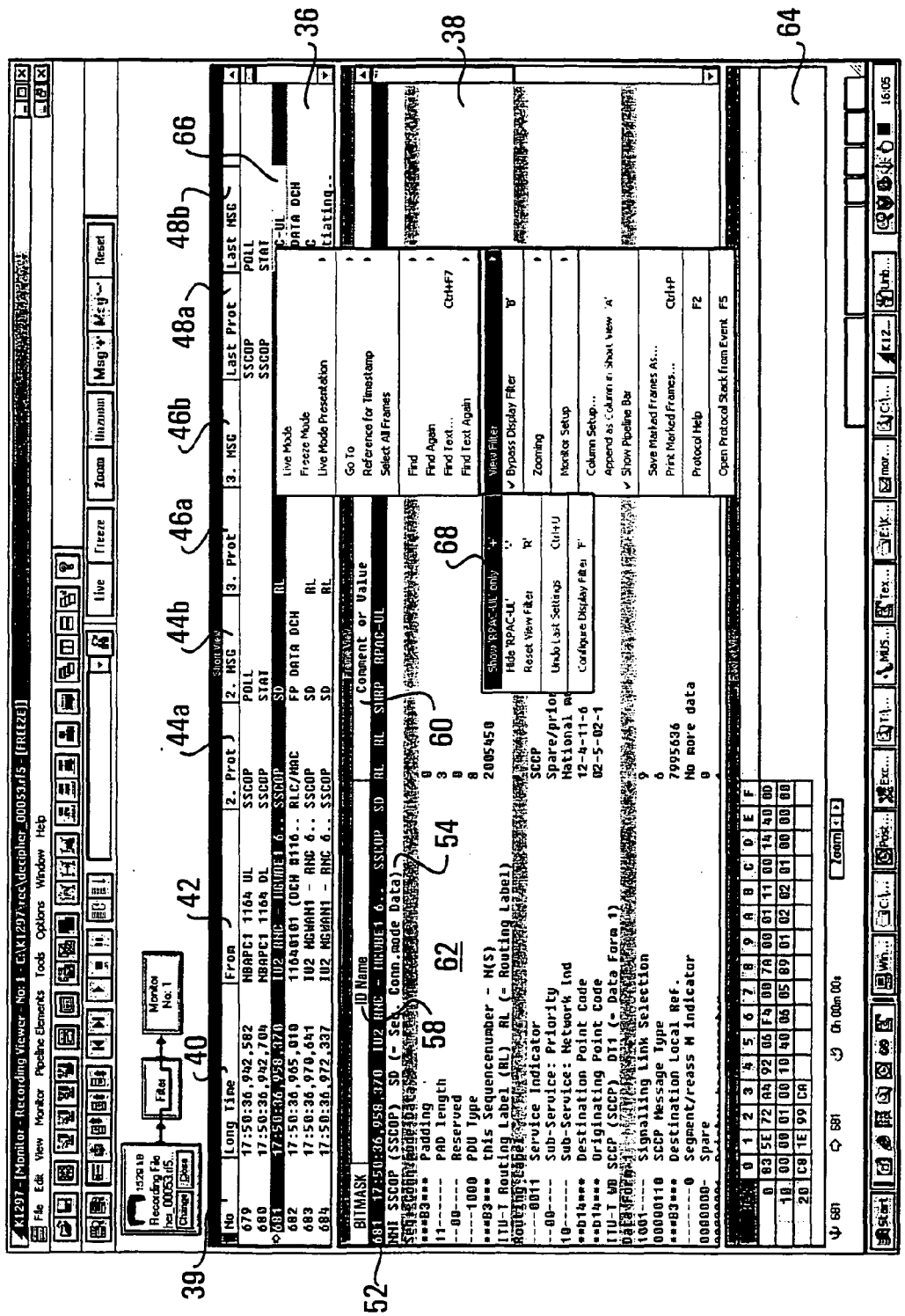
FIG. 8 is a plan view of a first graphical user interface for configuring a filter for a data stream according to the present invention.
Figure 9:
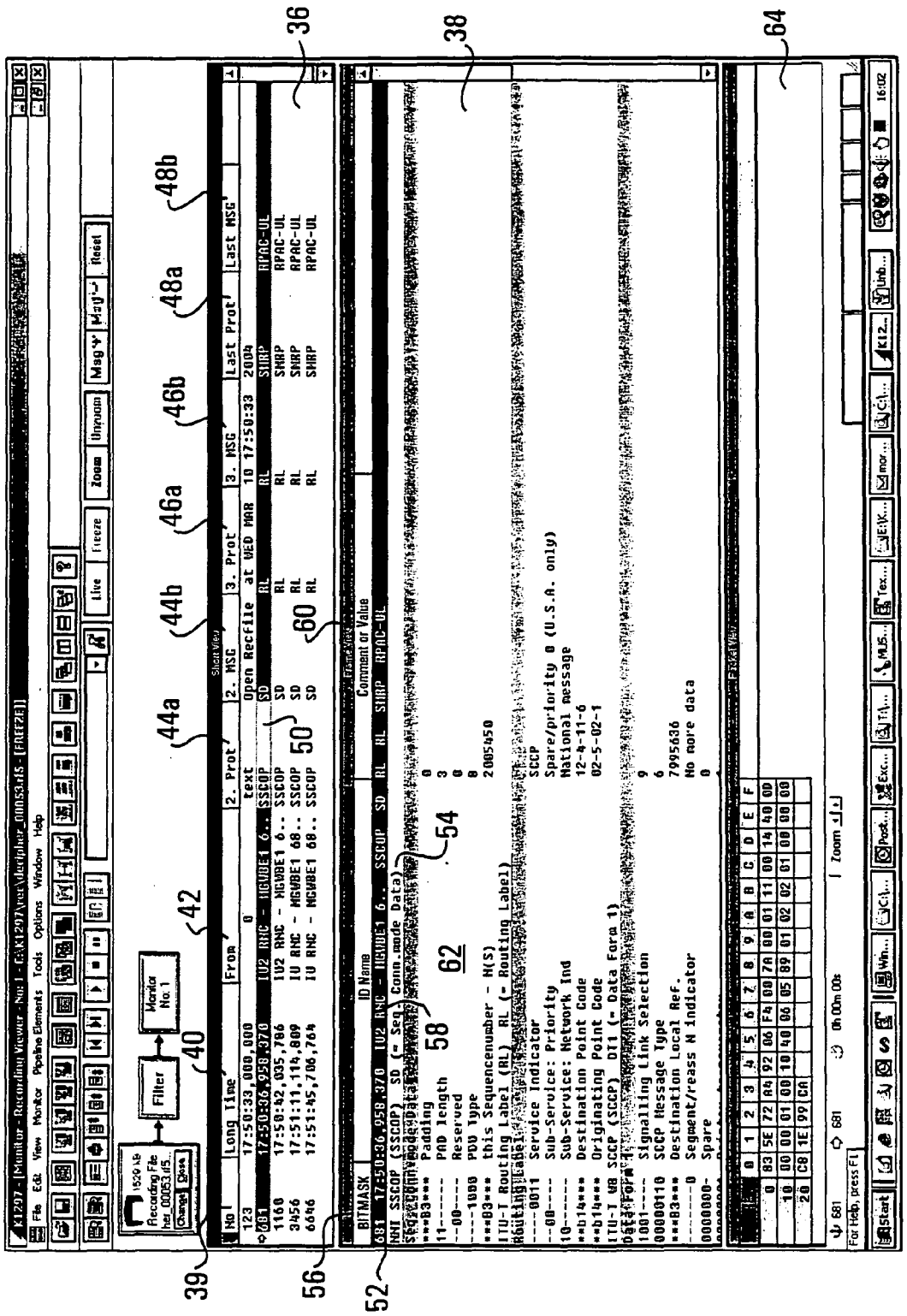
FIG. 9 is a plan view of a second graphical user interface for configuring a filter according to the present invention.

Referring now to FIG. 8 the graphical user interface shown is essentially the same as that of FIG. 6 except that FIG. 6 shows the result of the filtering while FIG. 8 shows the start of the filter configuration process according to the present invention. In the short view window 36 all of the frames exist (column 39) as shown by the consecutive numbering—these frames have not yet been filtered. The frame view window 38 shows the frame highlighted in the short view window 36 in a fully decoded format, the selected frame in this example having the number 681. Within frame 681 a particular cell 66 is highlighted—the message RPAC-UL. A corresponding display is seen in a pull-down window 68. The arrangement of the protocols and messages in the short view window 36 ranges from the lowest protocols on the left-hand side to the highest protocols in the OSI (Open Systems Interconnect) model on the right-hand side. Clicking on the pull-down window 68 triggers the corresponding filtering process, which results in the screen shown in FIG. 9. Comparing FIG. 9 with FIG. 6 clearly illustrates the advantages of the present method over the prior art. The identification of the frame to highlight may be achieved by scrolling through the frames in the short view window 36 until the desired message, RPAC_UL in this example, is found, or the desired message may be typed into a search dialog box to find the first instance of the desired message so that the frame to highlight and adjacent frames are shown in the short view window.

Figure 10:
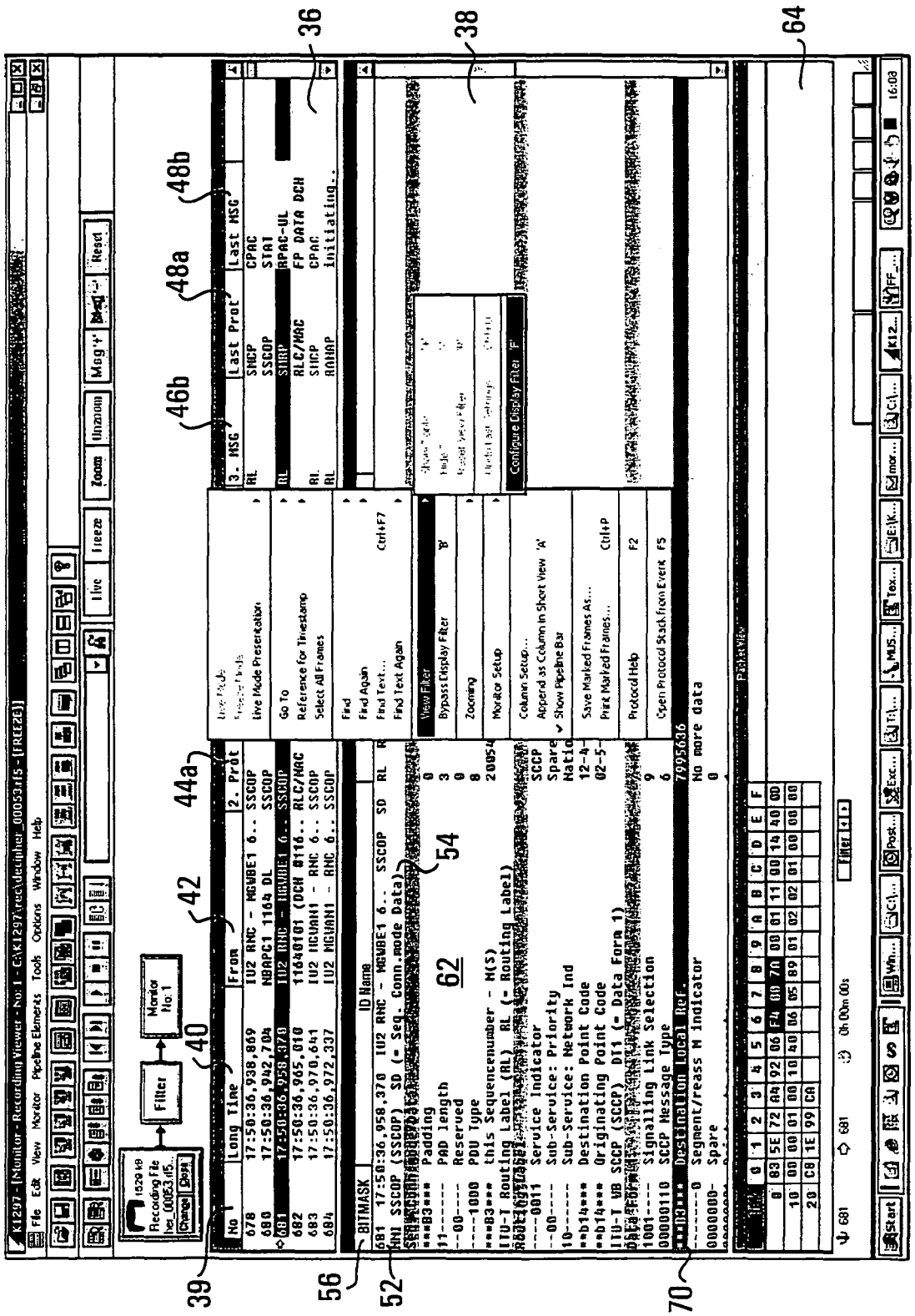
FIG. 10 is a plan view of a third graphical user interface for configuring a filter according to the present invention.

Referring now to FIG. 10 shows that not only the content of the frames shown in the short view window 36, but also the content of the frame shown in the frame view window 38 may be used for deriving a filter rule. By clicking on a particular line 70 the filter rule is derived, it being up to the user to modify the indicated value for the parameter "Destination Local Ref." by using wild cards or by defining a desired target range. In the selected frame window 64 the bytes belonging to the corresponding parameter are highlighted. Thus a distinction has to be made between two higher-level variants for defining the filter rule. For the first variant a content of the selected frame is used with reference to FIG. 6 in the short view window 36 for defining the filter rule, and then deriving a further filter rule (FIG. 9) by selecting a content in the frame view window 38. The other variant uses a content shown in the frame view window 38 for defining the filter rule by proceeding from the screen shown in FIG. 10.

Figure 11:
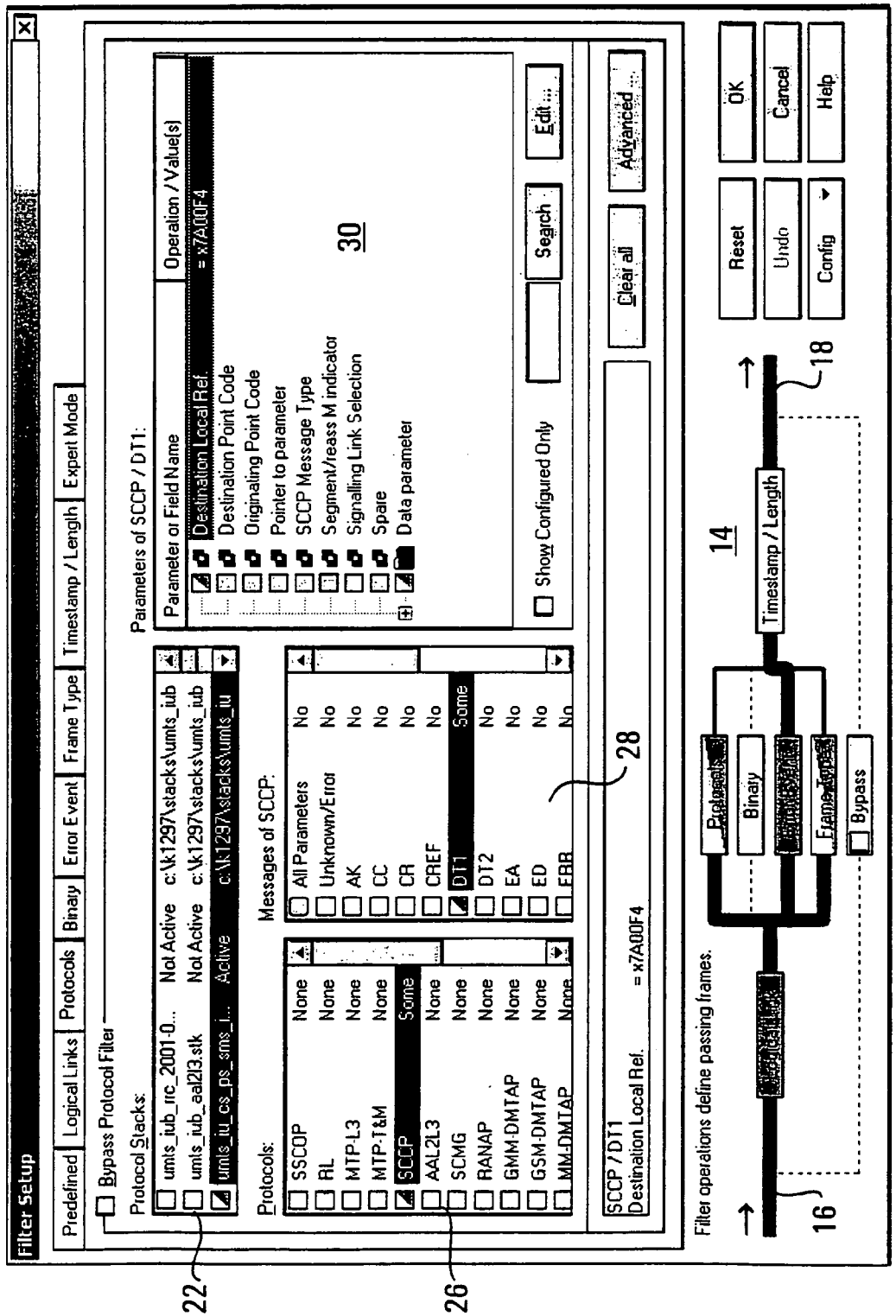
FIG. 11 is a plan view of a fourth graphical user interface for configuring a filter according to the present invention.
Figure 12:
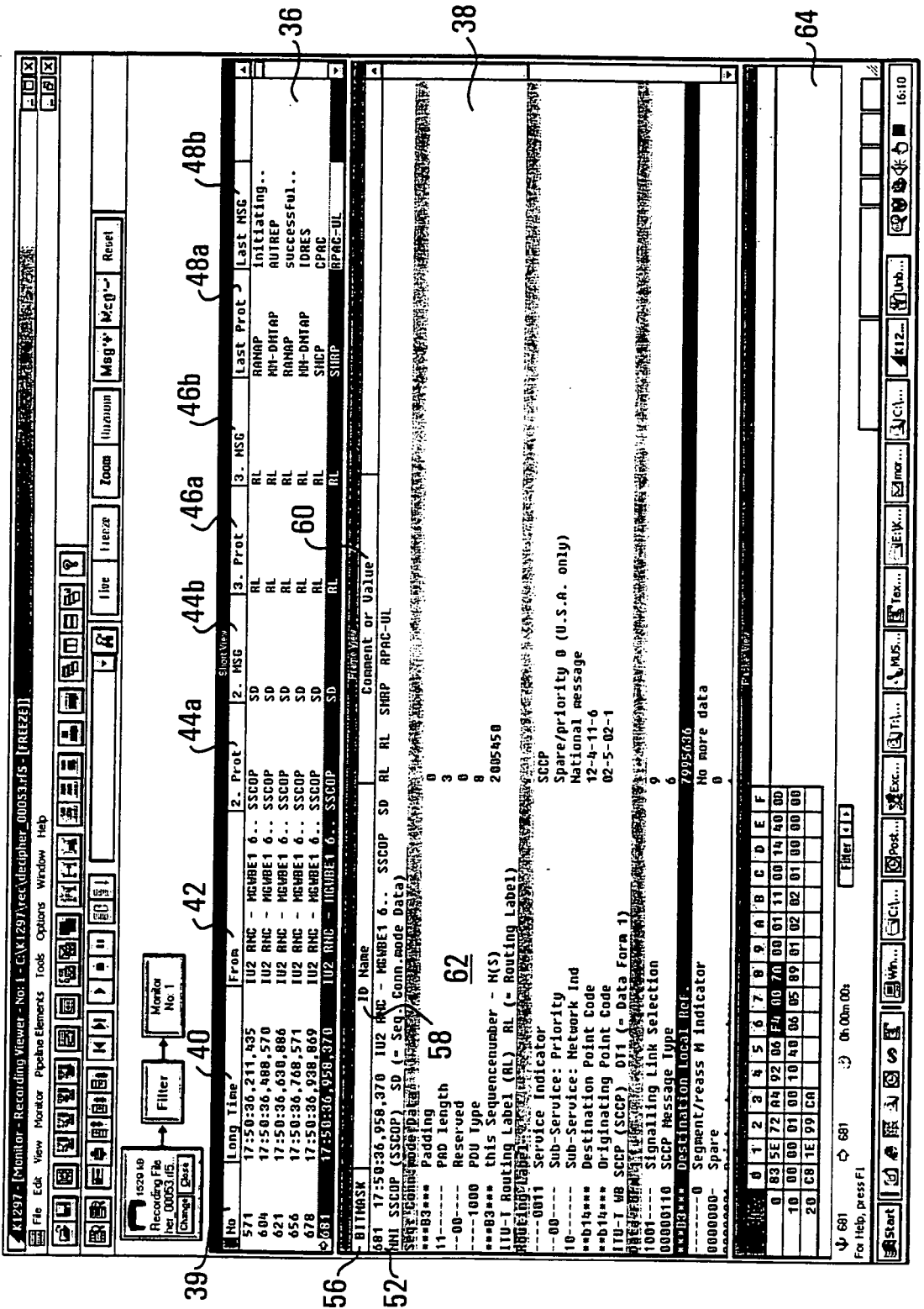
FIG. 12 is a plan view of a fifth graphical user interface for configuring a filter according to the present invention.

FIG. 11 shows where the parameter selected in the selected line 70 of FIG. 10 belongs, namely to the protocol stack umts_iu_cs_ps_sms_i . . . as shown in the stack window 22, to the protocol SCCP as shown in the protocol window 26, and to the message DT1 as shown in the message window 28. The parameter shown in the parameter window 30 may be modified for defining the filter rule, such as by use of wild cards or larger-than/equal-to, smaller-than/equal-to, not_equal_to operators, etc. FIG. 12 shows the corresponding filtered result, i.e., the short view window 36 shows the frames that fulfill the filter rule defined in FIG. 11. Additionally the content items of a frame where decoding errors occur may be marked visually for the user. By highlighting a corresponding content of the error frame it is possible to search for other frames that also show this content in a defective form.

Finally FIG. 13 shows a signal flow diagram which starts at step 100. In step 110 an overview of frames of the data stream is shown on the display unit, each frame having a frame identifier and at least one frame content. In step 120 a specific frame is highlighted, and in step 130 a specific content of the selected frame is highlighted for defining the filter rule. Thereafter in step 140 frames are shown on the display unit as a function of the filter rule. In step 150 the user decides whether or not to further define the filter rule. If the answer is "yes", the process returns to step 130 where the user is given the opportunity to highlight a further content of the frame to derive the filter rule therefrom. If the answer is "no", the process ends in step 160.

The basis of the present invention is the realization that the user may configure the filter to be applied to the data stream if a window displays the frames together with the contents of the frames, rather than starting at the high level protocol screen of the prior art. The user by highlighting, i.e., clicking on the content, defines the relevant content as the filter function and applies it to the data stream. The user does not have to have knowledge about the decoding since the protocol tester performs a partial decoding of the content of the relevant frame and shows the protocols and messages on the display. Thus the user does not have to learn a filter configuration syntax.

What is claimed is:

1. A method in a protocol tester for configuring a filter for a data stream organized in frames in a protocol tester comprising the steps of:

displaying an overview of the frames in the protocol tester;

selecting a specific frame having a desired content from the overview;

deriving a filter rule for configuring the filter from the desired content;

displaying frames filtered from the data stream as a function of the filter rule;

marking with an error identification feature a corresponding content of a frame where decoding errors have occurred; and deriving the filter rule based on the corresponding content in order to filter for frames exhibiting the error identification feature.

2. The method as recited in claim 1 wherein the desired content comprises one selected from the group consisting of protocols, messages, protocol data units and values of protocol data units.

3. The method as recited in claim 1 further comprising the step of displaying the specific frame in a hexadecimal format.

4. The method as recited in claim 1 wherein the filtered frames are displayed in a fully decoded format.

5. The method as recited in claim 4 further comprising the step of selecting a specific protocol data unit or a specific value of the specific protocol data unit from the fully decoded format to refine the filter rule.

6. The method as recited in claim 5 further comprising the step of modifying the specific protocol data unit or specific value to further refine the filter rule.

7. The method as recited in claim 6 further comprising the step of highlighting in a hexadecimal display of the specific frame the specific protocol data unit or specific value being modified in the modifying step.

8. A method for configuring a filter in a protocol tester, comprising:

displaying, in a first section of a graphical user interface, a list of frames captured from a data stream;

receiving a user selection of a frame displayed in the first section;

displaying, in a second section of the graphical user interface, the selected frame in a fully decoded format;

receiving a user selection of a message within the decoded selected frame;

receiving a user command to filter the captured frames using the selected message; and displaying, in the first section of the graphical user interface, a subset of the list of frames captured from the data stream, wherein each of the frames in the subset include the selected message;

highlighting, on the graphical user interface, decoding errors in content of one or more frames;

receiving a user selection of at least one decoding error; and displaying, in the first section of the graphical user interface, a subset of the list of frames captured from the data stream, wherein each of the frames in the subset include the decoding error.

9. The method of claim 8, further comprising:

receiving a user selection of a field within the decoded selected frame;

displaying, in a third section of the graphical user interface, a protocol stack window indicating a protocol stack to which the selected field belongs;

displaying, in a fourth section of the graphical user interface, a protocol window indicating a protocol to which the selected field belongs;

displaying, in a fifth section of the graphical user interface, a message window indicating a message to which the selected field belongs; and displaying, in a sixth section of the graphical user interface, a parameter window listing one or more parameters that may be modified to define a filter rule.

10. The method of claim 8, further comprising:

receiving a user selection of at least one parameter displayed in the parameter window; and displaying, in the first section of the graphical user interface, a subset of the list of frames captured from the data stream, wherein each of the frames in the subset include the selected parameter.

* * * * *